US006600581B1

(12) United States Patent
Fatehi et al.

(10) Patent No.: US 6,600,581 B1
(45) Date of Patent: Jul. 29, 2003

(54) CONNECTION VERIFICATION IN OPTICAL CROSS-CONNECT ARRANGEMENTS

(75) Inventors: Mohammad Taghi Fatehi, Middletown, NJ (US); Victor Bernard Lawrence, Holmdel, NJ (US); Kazem Anaraky Sohraby, Lincroft, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/386,761

(22) Filed: Aug. 31, 1999

(51) Int. Cl.$^7$ .............................................. H04B 10/08
(52) U.S. Cl. ...................................... 359/110; 359/117
(58) Field of Search ................................ 359/110, 117, 359/128, 123, 124, 139, 165

(56) References Cited

U.S. PATENT DOCUMENTS

| | | | | |
|---|---|---|---|---|
| 4,939,721 A | * | 7/1990 | De Bosio | 370/60 |
| 5,524,153 A | | 6/1996 | Laor | 385/16 |
| 5,745,274 A | | 4/1998 | Fatehi et al. | 359/187 |
| 5,801,863 A | | 9/1998 | Fatehi et al. | 359/124 |
| 5,892,606 A | | 4/1999 | Fatehi et al. | 359/177 |
| 5,930,013 A | * | 7/1999 | Fatehi et al. | 359/117 |
| 5,959,767 A | * | 9/1999 | Fatehi et al. | 359/341 |
| 6,111,673 A | * | 8/2000 | Chang et al. | 359/123 |
| 6,469,812 B2 | * | 10/2002 | McKiel, Jr. | 359/110 |

OTHER PUBLICATIONS

Heismann, F. et al., "Signal Tracking and Performance Monitoring In Multi–Wavelength Optical Networks", 22$^{nd}$ European Conference on Optical Communication, Sep. 15–19, 1996, vol. 3, pp. 3.47–3.50.

* cited by examiner

Primary Examiner—John Tweel
(74) Attorney, Agent, or Firm—Gregory J. Murgia (57) ABSTRACT

A method is provided for verifying that optical signals are properly routed between inputs and outputs of an optical cross-connect according to the prescribed routing paths defined in the cross-connect map. More specifically, optical signals are independently tagged at the cross-connect input ports with connection verification messages containing identification information. Connection verification messages can include, among other information, a message identification, incoming and outgoing wavelength information, incoming and outgoing port information, a time stamp, user verification data, and so on. At the cross-connect output ports, the messages are retrieved (and optionally removed) from the optical signals so that the identification information from the retrieved messages can be compared to the routing defined in the cross-connect map. If an optical signal is verified as not being routed according to the prescribed connection defined in the cross-connect map, then remedial action, such as tearing down the connection, can be initiated. By applying the tag to the optical signal, cross-connections can be verified in cross-connect applications employing one optical signal (i.e., wavelength) at each input and output port or applications employing a WDM signal having many optical channels of different wavelengths at each input and output port.

27 Claims, 4 Drawing Sheets

| MESSAGE ID | INCOMING WAVELENGTH ID | OUTGOING WAVELENGTH ID | INCOMING OXC PORT ID | OUTGOING OXC PORT ID | TIME STAMP | USER VERIFICATION DATA | ERROR DETECTION/ CORRECTION |
|---|---|---|---|---|---|---|---|
| 401 | 402 | 403 | 404 | 405 | 406 | 407 | 408 |

CONNECTION VERIFICATION IN OPTICAL CROSS-CONNECT ARRANGEMENTS

FIELD OF THE INVENTION

This invention relates generally to lightwave communication networks and, more particularly, to optical cross-connect arrangements for routing optical signals in such networks.

BACKGROUND OF THE INVENTION

Optical fiber is becoming the transmission medium of choice for many communication networks because of the speed and bandwidth advantages associated with optical transmission. In addition, wavelength division multiplexing (WDM) is being used to meet the increasing demands for higher data rates and more bandwidth in optical transmission applications. In its simplest form, WDM is a technique whereby parallel data streams modulating light at different wavelengths are coupled simultaneously into the same optical fiber. As such, a WDM signal is typically viewed as a composite signal comprising a parallel set of optical channels sharing a single transmission medium, each optical channel using a different frequency (wavelength of light). Although each optical channel actually includes a range of frequencies (wavelengths), those skilled in the art typically refer to an optical channel in terms of its center wavelength. Moreover, the terms "optical signal", "optical channel", "wavelength channel", and wavelength are sometimes used interchangeably in the WDM context to refer to a constituent optical signal within the composite WDM signal. Similarly, in a non-WDM context, the term "optical signal" is typically used to refer to a single wavelength of light (e.g., single optical channel, single wavelength channel, etc.).

In communication networks, it is sometimes desirable to selectively route individual optical signals or WDM signals to different destinations. As is well known, the component typically used for selectively routing signals through interconnected nodes in a communication network is a high capacity optical switch matrix or cross-connect switch. Because of the aforementioned speed and bandwidth advantages associated with transmitting information in optical form, all-optical network elements are emerging as the preferred solutions for optical networking. Moreover, all-optical network elements are needed to provide the flexibility for managing bandwidth at the optical layer (e.g., on a wavelength by wavelength basis). Accordingly, all-optical cross-connects are being contemplated for use in these networks. However, despite the amount of attention that is being given to the specific candidate technologies for implementing the optical cross-connect fabrics, much less attention has been given to the management of the optical cross-connect fabric.

For example, the traditional way of managing connections in a cross-connect fabric is based on using a cross-connect controller in conjunction with a cross-connect map. As is well-known, a cross-connect map specifies input-to-output routing of optical signals passing through the cross-connect fabric and is typically based on a target network configuration. By way of example, a controller responds to routing requests (e.g., from an operations support system, adjacent cross-connects, other network elements, etc.) and establishes routing paths between inputs and outputs of the cross-connect fabric according to mappings set up in the cross-connect map.

Most methods for verifying cross-connections of optical signals have been limited to the use of the information provided in the cross-connect map. As used herein, verification is meant to refer to the act of verifying that the connections being made from the cross-connect inputs to outputs are correct. For example, in response to a query from the operations support system as to whether a cross-connection has been properly set up in the fabric, the controller typically will only query the cross-connect map, i.e., interrogate the connections specified in the cross-connect map, instead of checking the actual inputs and outputs of the fabric. In these schemes, the controller assumes that the image (e.g., the connections specified in the cross-connect map and displayed at the controller) represents the actual connection paths in the fabric. However, in effect, only the cross-connect map itself is being verified without any independent verification of the actual paths set up in the fabric.

In existing optical transmission applications, other techniques are presently used to verify routing of individual signals. For example, systems based on the well-known Synchronous Optical Network/Synchronous Digital Hierarchy (SONET/SDH) standard rely on information carried within the individual signals. In particular, selected bytes (e.g., J0/J1 bytes) in SONET overhead are reserved for routing information, channel identification, and the like. However, this information is only available in electronic form, that is, in bits/bytes that are extracted from digital overhead after the optical signals have been converted to electrical signals (i.e., after optical to electrical (O/E) conversion). Among other disadvantages, this approach can become quite costly because of the need for high speed circuitry for optical to electrical conversion and electronic signal processing for each signal at each input/output port. In addition to cost, implementation can become quite complex, especially for high capacity optical cross-connects having many inputs/outputs. Furthermore, operating in the electrical domain to access the payload bit stream for verifying signal routing defeats the whole purpose of all-optical network elements, e.g., optical cross-connects, which are designed to capitalize on the benefits of all-optical transmission and signal routing. Additionally, some signals used in other applications, e.g., Internet Protocol-based, are not inherently in SONET/SDH format and, consequently, do not even have the J0/J1 byte type of overhead for verifying routing information even in the electrical domain.

SUMMARY OF THE INVENTION

Verification that an optical signal has been properly routed from an input to an output of an optical cross-connect is achieved according to the principles of the invention by independently tagging an optical signal (e.g., wavelength) with identification information at a cross-connect input, retrieving the identification information from the tagged optical signal at a cross-connect output, and determining from the retrieved identification information whether the optical signal was routed according to a predetermined route.

In one illustrative embodiment, a connection verification message is created for each cross-connection based on predetermined routes defined in a cross-connect map. The connection verification message can include a message identification, incoming and outgoing wavelength information, incoming and outgoing port information, a time stamp, user verification data, and so on. At each input to the cross-connect, the respective connection verification message is tagged onto its respective optical signal or signals. By way of example, tagging can be accomplished by directly modulating the envelope of the optical signal or by modulating the optical signal with a low frequency subcarrier that has been modulated with the connection verification message. At each cross-connect output, the message (tag) is retrieved or removed and information in the retrieved message for each optical signal is then compared with the cross-connection specified in the cross-connect map to determine whether the optical signals were routed correctly. If not, then remedial actions can be initiated, e.g., notify operations support system or adjacent network element, tear-down connection, etc.

In contrast to prior connection verification arrangements, optical-to-electrical or electrical-to-optical signal conversions for accessing the payload (e.g., high speed data) are avoided and actual connections between inputs and outputs are independently verified. Moreover, by applying the tag to the optical signal, routing verification according to the principles of the invention can be used in cross-connect applications employing one optical signal (i.e., wavelength) at each input and output or applications employing a WDM signal having a plurality of optical channels of different wavelengths at each input and output.

BRIEF DESCRIPTION OF THE DRAWING

A more complete understanding of the principles of the invention may be obtained from consideration of the following detailed description in conjunction with the drawing, with like elements referenced with like references, in which.

DETAILED DESCRIPTION OF THE INVENTION

Although the illustrative embodiments described herein are particularly well-suited for optical cross-connects, and shall be described in this exemplary context, those skilled in the art will understand from the teachings herein that the principles of the invention may also be employed in conjunction with other network elements used for routing, switching, selecting, or connecting signals. The principles of the invention therefore apply to these other network elements even though they may be referred to as routers, switches, cross-connects, and so on. Moreover, the principles of the invention and the embodiments thereof are contemplated for use with various types of switching fabrics that may be used for routing, switching, and connecting optical signals. Some exemplary switch fabrics include, but are not limited to grating-based fabrics, micro-electromechanical system (MEMS)-based fabrics, and so on. See, e.g., U.S. patent application Ser. No. 09/123,085, entitled *"Wavelength-Selective Optical Cross-Connect"*, filed on Jul. 27, 1998, and U.S. patent application Ser. No. 09/370,824, entitled *"Optical Wavelength-Space Cross-Connect Switch Architecture"*, filed on Aug. 9, 1999, both of which are incorporated by reference herein. Accordingly, the embodiments shown and described herein are only meant to be illustrative and not limiting.

Figure 1:
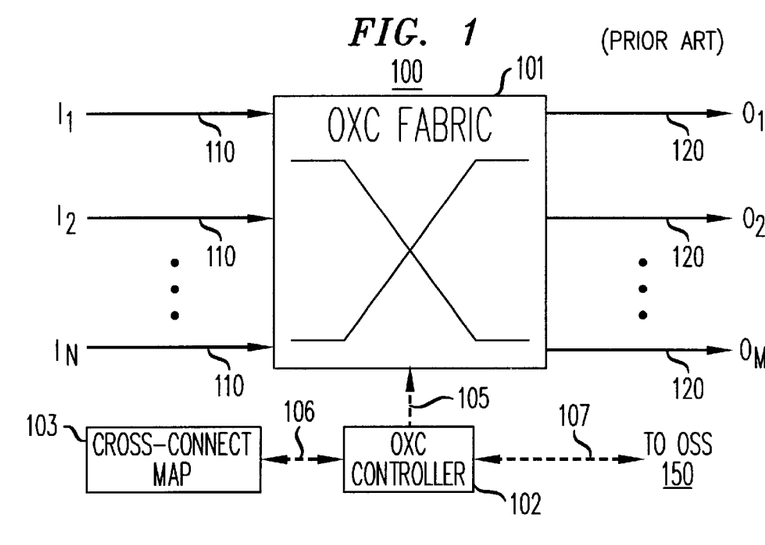
FIG. 1 shows a typical cross-connect arrangement.

FIG. 1 shows the basic architecture of an optical cross-connect arrangement 100 comprising optical cross-connect (OXC) fabric 101, controller 102, and cross-connect map 103. As shown, fabric 101 has a plurality of input ports 110, designated here as $I_1, I_2, \ldots I_N$, and a plurality of output ports 120, designated here as $O_1, O_2, \ldots O_{M'}$, thus forming a N×M cross-connect which can route optical signals from any input port 110 to any output port 120. Dotted lines 105–107 are intended to show the flow of control between the various components of cross-connect arrangement 100.

Cross-connect 100 may either be a so-called space-only cross-connect (also referred to as a fiber cross-connect) in which a single optical channel (e.g., single wavelength) or an entire WDM signal (e.g., all wavelengths) supplied at an input port 110 are capable of being cross-connected to any output port 120. Alternatively, cross-connect 100 may be a so-called space-wavelength cross-connect (also referred to as a wavelength-selective cross-connect) in which individual optical channels (i.e., wavelengths) of a WDM signal are capable of being cross-connected on a per-wavelength basis between each input port 110 and output port 120. In either case, the basic function of cross-connect 100 is to cross-connect or otherwise route an optical signal from an input port 110 to an output port 120.

Controller 102 is further coupled to operations support system 150. In operation, cross-connections between input ports 110 and output ports 120 are established in fabric 101 under the control of controller 102. More specifically, controller 102 communicates with and receives commands from operations support system 150 or other network elements (not shown), e.g., adjacent cross-connects, as shown by dotted line 107. As an example, operations support system 150 may maintain a network-level cross-connect map and issue commands to controller 102 in the form of routing requests for particular optical signals. Upon receiving routing requests and the like, controller 102 establishes or updates a cross-connection mapping between input ports 110 and output ports 120 in cross-connect map 103. The communication from controller 102 to cross-connect map 103 during the setup phase is shown by dotted line 106. It should be noted that the basic principles of operation and interaction between controller 102 and cross-connect map 103 are well-known to those skilled in the art. By way of example, cross-connect map 103 may be a look-up table showing the mappings between input ports 110 and output ports 120 to be implemented in fabric 101. Alternatively, cross-connect map 103 may be implemented with an algorithm.

After updating cross-connect map 103, controller 102 then operates according to well-known techniques to apply the mappings in fabric 102 to effect the routing of the optical signals. Of course, the form of control used by controller 102 (e.g., via dotted line 105) to effect the routing will depend on the technology being used in fabric 101.

Figure 2:
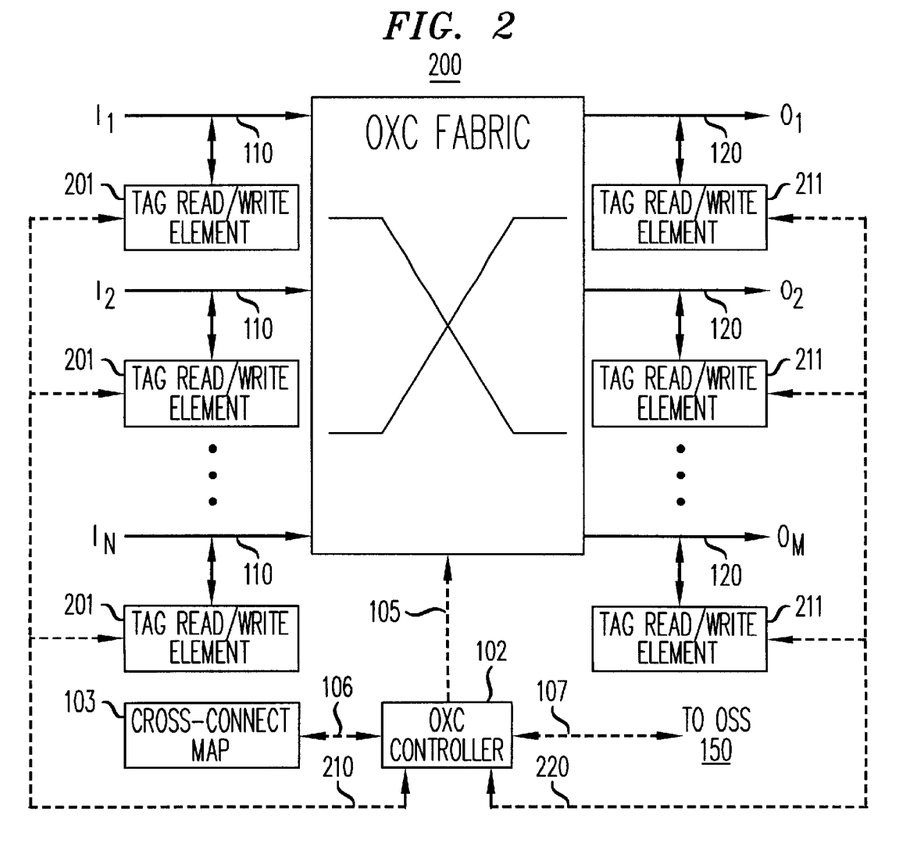
FIG. 2 shows an illustrative embodiment of the invention as applied to the cross-connect arrangement shown in FIG. 1.

FIG. 2 shows how the principles of the invention may be applied to an optical cross-connect. For sake of brevity, the structure and function of elements shown in FIG. 2 which are the same as those previously described in FIG. 1 will not be repeated. As shown, optical cross-connect 200 includes a plurality of tag read/write elements 201 associated with a respective one of the plurality of input ports 110. Controller 102 controls (as shown by dotted line 210) the tag read/write elements 201 (in the write mode) to attach tags to the respective optical signals at input ports 110. As will be described in further detail below, tags include identification information that is derived by controller 102 from cross-connect map 103. A plurality of tag read/write elements 211 are also associated with respective ones of the plurality of output ports 120. At output ports 120, tags are retrieved from the optical signals at output ports 120 by tag read/write elements 211 (in the read mode) also under the control of controller 102 (as shown by dotted line 220). As will be described in further detail below, the identification information contained in the tags is retrieved so that controller 102 can check and compare the actual cross-connections made at switch fabric 101 to the prescribed cross-connections that are defined in cross-connect map 103. It should also be noted that the tags may also be removed from the optical signals at output ports 120 if desired. The verification of cross-connections based on the use of tags will be described in further detail below.

As previously indicated, the cross-connect arrangement shown in FIG. 2 can be applied in at least two exemplary contexts. Namely, cross-connect 200 may be a so-called space-only cross-connect wherein a single optical signal supplied at any input port 110 may be cross-connected to any output port 120. Alternatively, a WDM signal (i.e., multiple optical channels) supplied to each input port 110 may be cross-connected as a bundle to any output port 120. In this latter case of a WDM signal, tagging may be carried out in one embodiment by attaching a tag on a single wavelength within the WDM signal such that the tag applies to the entire WDM signal, since the entire WDM signal (i.e., all wavelengths) are being cross-connected together as a composite signal (e.g., bundled). In either of these cases, a tag associated with a single optical channel (or an entire WDM signal) retrieved at each output port 120 is used by controller 102 to verify whether the actual cross-connections agree with the connections declared in cross-connect map 103.

Cross-connect 200 may also be a so-called space-wavelength cross-connect in which each input port 110 and output port 120 is capable of receiving and transmitting a WDM signal comprising a plurality of wavelengths and wherein fabric 101 is capable of cross-connecting optical signals on a per-wavelength basis. In this case, tags can be provided for each of the plurality of optical channels within each WDM signal at each input port 110. The tags retrieved at output ports 120 are then used to verify whether the actual cross-connections of the individual optical channels (each wavelength) agree with the connections declared in cross-connect map 103.

Figure 3A:
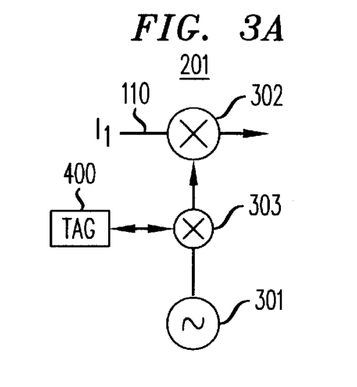
FIGS. 3A–3C show various illustrative embodiments for tagging optical signals with cross-connection verification messages according to the principles of the invention.
Figure 3B:
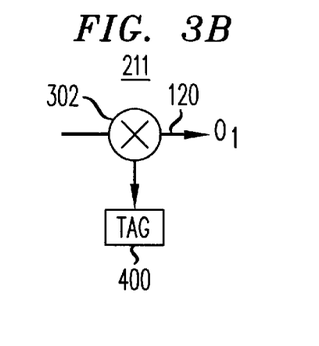
Figure 3C:
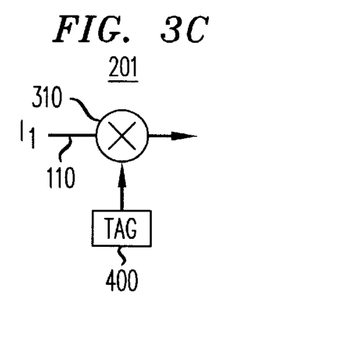

FIGS. 3A through 3C show various embodiments for implementing tag read/write elements 201 and 211 for attaching and retrieving tags to and from optical signals at the cross-connect inputs and outputs. It should be noted that these examples are meant to be illustrative only and not limiting in any way. Namely, other suitable methods for impressing or otherwise attaching the tags to the optical signals will be apparent to those skilled in the art. In particular, it is contemplated that the methods for tagging signals described in U.S. Pat. No. 5,801,863 (issued Sep. 1, 1998), U.S. Pat. No. 5,892,606 (issued Apr. 6, 1999), and 5,745,274 (issued Apr. 28, 1998), each of which is incorporated by reference herein, can be used in conjunction with the teachings of the present invention to impress the identification information onto optical signals at the cross-connect inputs and outputs.

For example, these patents teach methods of individually tagging (e.g., by modulating) an optical signal with unique identifier signals (e.g., frequency tones), as well as regenerating and removing these identifier signals from the optical signal. The frequency of this low index carrier modulation preferably lies outside the information bandwidth of the optical signal, such as 4 kHz to 100 kHz for example. Furthermore, these patents teach that the identifier signals can also be modulated (e.g., secondary modulation) to carry additional information. Tagging of multi-wavelength signals is also described in detail in these patents, all of which is incorporated by reference herein. Referring back to FIG. 2, each input port 110 and output port 120 that carries an optical signal to be tagged and/or removed would therefore include a circuit as described in these patents for either adding, retrieving, or removing tags to the optical signals.

In general, it should be noted that tag read/write elements 201 and 211 can be used in either the read or write mode. For example, tag read/write elements 201 can be used as previously described to attach tags (e.g., in the write mode) to optical signals at the cross-connect inputs. However, it will be appreciated by those skilled in the art that various modifications may be made consistent with the teachings of the present invention. For example, tag read/write element 201 may be used in the read mode such as when tags are already attached to incoming optical signals (e.g., by upstream network elements). In this mode, tag read/write elements 201 would retrieve the tags from the incoming signals for use by controller 102 as desired. Similar modifications may be made in the operation of tag read/write elements 211 at the cross-connect outputs.

More specifically, FIG. 3A shows a simplified block diagram of one implementation of tag read/write element 201 for attaching tags to an incoming optical signal, shown here as $I_1$. In particular, modulator 302 is coupled to one of input ports 110 for modulating an optical signal at input port 110 with a low frequency tone, e.g., subcarrier, generated by a tone or signal generator 301. The subcarrier signal is encoded with tag 400 (the contents and format of which will be described below in more detail) using modulator 303. As such, tag 400 is effectively tagged to the optical signal at input port 110. In FIG. 3B, the reverse operation is shown where tag 400 is removed from the optical signal at output port 120 of the cross-connect. Again, the aforementioned patents describe removal of the low frequency modulated subcarrier from the optical signal. Other techniques will also be apparent to those skilled in the art.

For example, FIG. 3C shows an exemplary embodiment of a direct modulation scheme that can also be used for impressing the identification information onto an optical signal. In one example, the direct modulation could be amplitude modulation where the envelope of the optical signal at input port 110 is modulated by modulator 310 with a low bit rate tag 400. As compared with the previous examples in FIGS. 3A and 3B, the direct modulation scheme in FIG. 3C eliminates the need for the subcarrier modulated tones. It is contemplated that the modulation index for the embodiment in FIG. 3C would be relatively small, e.g., 1%–10%, depending on the impairments in the fabric.

Figure 4:
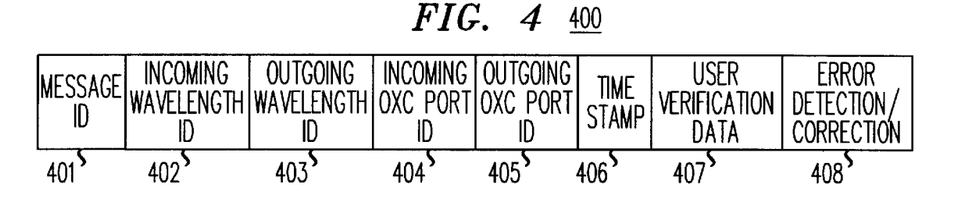
FIG. 4 shows an exemplary message format for the cross-connection verification message (tag) according to the principles of the invention.

FIG. 4 shows an exemplary message format for tag 400 (FIGS. 2 and 3) according to the principles of the invention. As shown, message fields 401–408 include information relating to the routing and other optional information that may be of benefit in cross-connect routing or verification operations. It should be noted that the content of message fields 401–408 is meant to be illustrative only and not limiting in any way.

More specifically, message identification field 401 is useful for identifying the particular message that is being used by controller 102 (FIG. 2) for connection verification. Different types of identifiers can also be used to denote different message types. This field can also be used to convey information such as message name, message number, message length for variable length messages, and so on. Incoming wavelength identification field 402 identifies the number (or other identification means) assigned to the wavelength channel at the cross-connect input. Outgoing wavelength identification field 403 can be used to identify the wavelength channel that is expected after a possible wavelength conversion at the cross-connect output. However, when wavelength conversion is not being done, then this field will typically be the same as the incoming wavelength identification field 402. This field could also have other uses depending on the particular application, e.g., in wavelength interchanging cross-connects, and so on. Incoming cross-connect port identifier 404 contains the physical port identification on the incoming side of the optical cross-connect. Similarly, outgoing cross-connect port identifier 405 contains the physical port identification on the outgoing side of the cross-connect to the wavelength channel being connected.

Timestamp field 406 is an optional message field that can have various uses. For example, when using real-time clock (or other means such as Internet Network Time Protocol (NTP) timing source) at the cross-connect, the time generation/transmission of the verification message can be included in this field. By so doing, certain abnormalities can be identified, e.g., excessive delays inside the cross-connect fabric. Timestamp field 406 can also be used for synchronization between input and output ports of the cross-connect, if necessary.

Message field 407 can be used for user-specified (user-defined) verification data. For example, to detect the connection as well as its transmission quality, a known pattern of information can be included in this field. At the receiving port of the cross-connect, the same pattern should be received in the case of no transmission errors. This field can also be used for out-of-service verification, e.g., as part of provisioning before the system is placed in service. Other types of user-defined functions will be apparent to those skilled in the art and are contemplated by the teachings herein. Error detection/correction field 408 can be used to carry detection/correction codes (e.g., checkbits) to ensure the integrity of the contents (all or some) of message 400, for example.

It should be noted that the actual message length and other attributes of message 400 can be a matter of design choice depending on such factors as the available bandwidth for the tag, the modulation scheme being used, other system parameters, etc.

Figure 5:
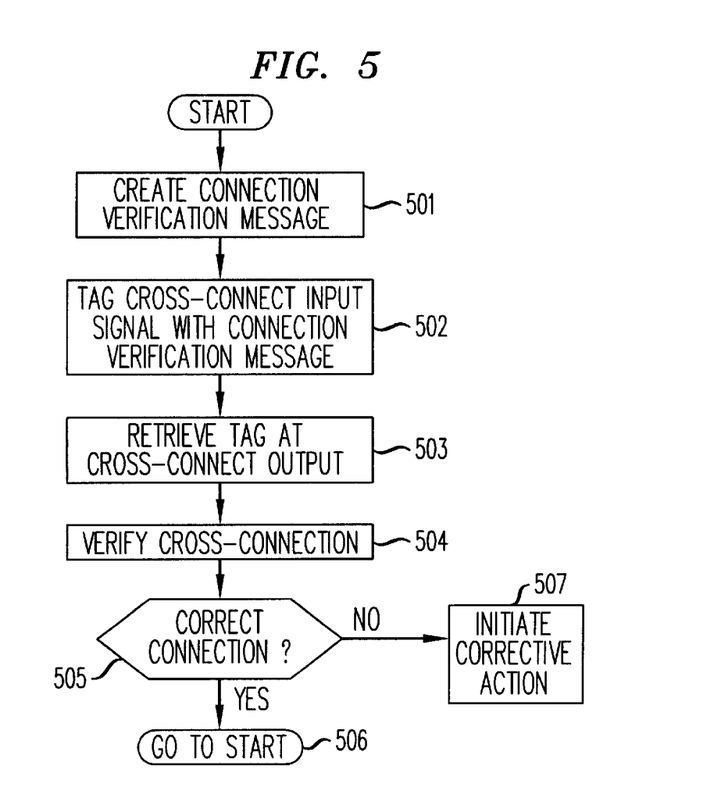
FIGS. 5–7 are simplified flow diagrams of exemplary embodiments of the method of verifying cross-connections according to the principles of the invention.

Referring now to FIG. 5, a simplified flow diagram illustrates the steps associated with connection verification according to the principles of the invention. The steps will be described with reference to cross-connect 200 (FIG. 2) and the message format of tag 400 (FIG. 4). As shown, tags 400 in the form of connection verification messages having contents shown in FIG. 4 are created in step 501 by controller 102 (FIG. 2) for each of the optical signals being routed in the cross-connect. Optical signals at input ports 110 are tagged in step 502 with respective connection verification messages by tag read/write elements 201 again under the control of controller 102 (FIG. 2). As previously noted, a single optical signal (e.g., single wavelength) may be tagged, an individual optical channel within a WDM signal may be tagged (bundled operation), or each individual optical channel in a WDM signal (e.g., per wavelength operation) may be tagged with a connection verification message. After the optical signals are cross-connected or otherwise routed through fabric 101, tags 400 containing connection verification messages are retrieved in step 503 from the optical signals at output ports 120.

The information in a connection verification message corresponding to an optical signal at an output port 120 is first checked by controller 102 in step 504 against the cross-connect map 103 (FIG. 2). In particular, controller 102 determines whether the proper cross-connection was made in fabric 101 by checking to see if the routing-related information in the connection verification message taken from the optical signal at the actual output of the cross-connect corresponds to the prescribed and or predetermined input/output connection specified in cross-connect map 103. If a proper connection is verified in step 505, then connection verification can continue under normal conditions. If, however, connection verification fails, i.e., actual connection does not match prescribed connection in cross-connect map, then controller 102 will initiate appropriate remedial action which may include, for example, alarms, tearing down the connection, and so on. If desired, tag 400 containing the connection verification message may also be removed from the optical signals at output ports 120.

Figure 6:
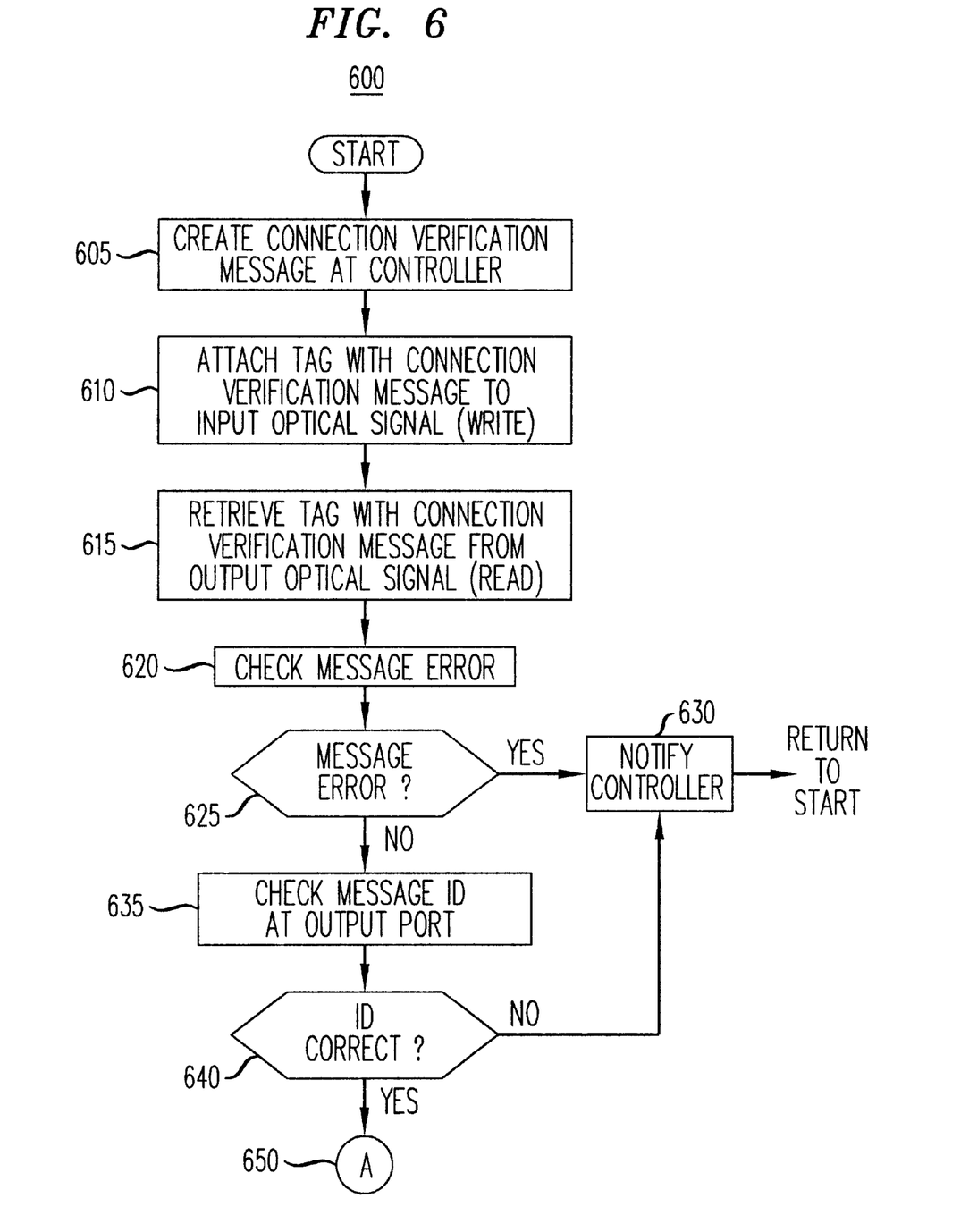
Figure 7:
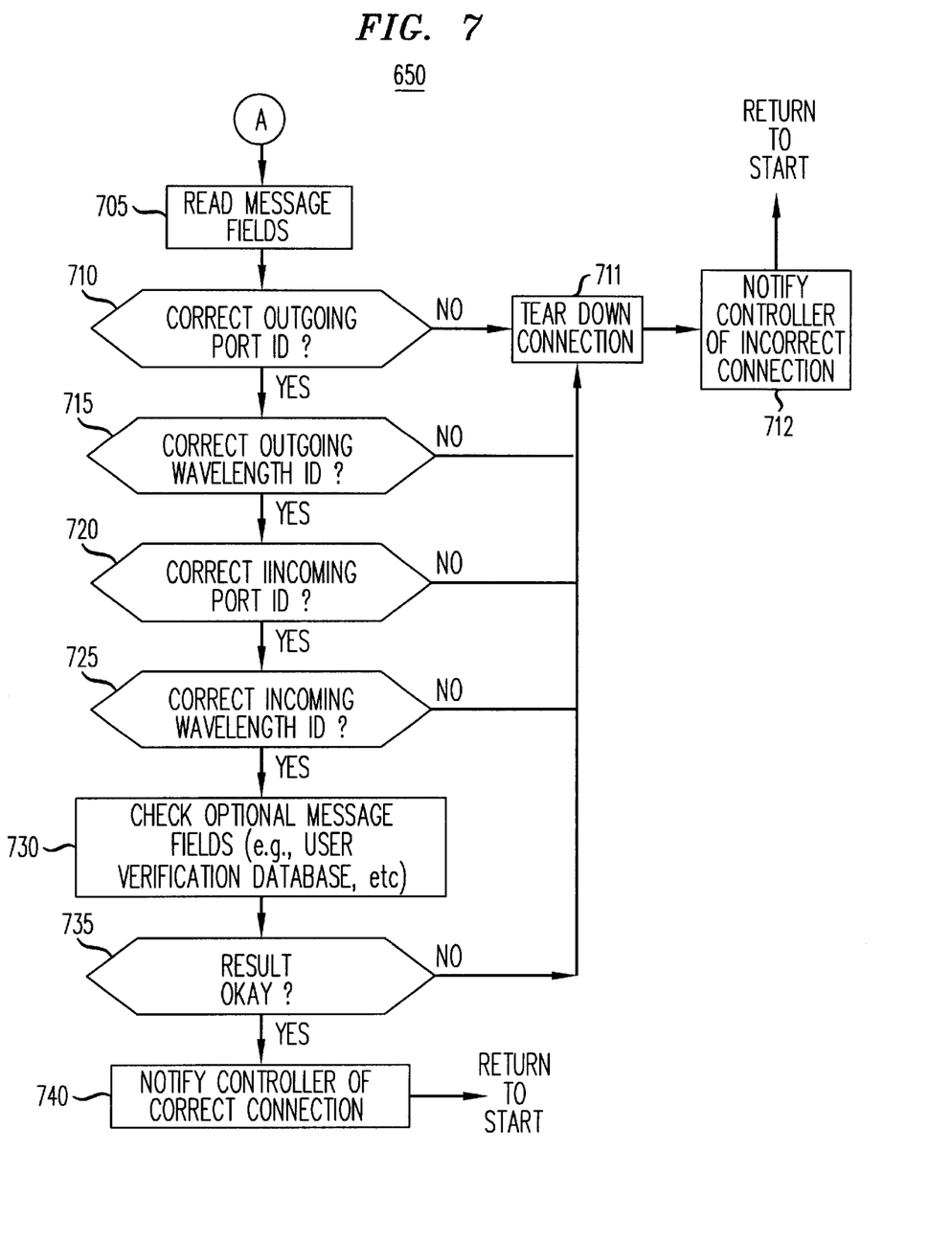

FIGS. 6 and 7 are more detailed flow diagrams of an illustrative embodiment of the invention for in-service connection verification. Again, the steps will be described with reference to cross-connect 200 (FIG. 2) and the connection verification message format used in tag 400 (FIG. 4). More specifically, the process starts at step 605 where the connection verification message using message format shown in FIG. 4 is created by controller 102 (FIG. 2). For example, using the prescribed routing set up in cross-connect map 103, controller 102 initiates a connection verification message periodically at each cross-connect input port (e.g., X) 110 and for each incoming wavelength (e.g., $\lambda 1$), for each outgoing cross-connect output port (e.g., Y) 120, and outgoing wavelength (e.g., $\lambda 2$). In step 610, the optical signals at cross-connect input ports 110 are tagged (e.g., in write mode) with their respective connection verification messages created in step 605. In this example, the envelope of the signal at wavelength (e.g., $\lambda 1$) is modulated with the message.

At cross-connect output port (Y) 120, the connection verification message is retrieved (e.g, in read mode) from the optical signal in step 615. Step 620 checks for message error by regenerating the error check field (408 from FIG. 4) and comparison with that of the message. If the message is in error (step 625), then controller 102 is notified, alarms are raised, etc. (step 630). If the message is not in error in step 625, then the message identification field 401 of connection verification message format 400 (FIG. 4) is read at cross-connect output port (Y) 120 for $\lambda 2$. If the message identification is not correct (step 640), then the controller is notified (step 630) of the error and all message fields in connection verification message 400 are reported to controller 102 (FIG. 2). If the message identification is correct, then the remaining fields are then checked in step 705 as shown in process 650 in FIG. 7.

More specifically, the outgoing cross-connect port identifier 405 (FIG. 4) is checked in step 710. If not correct, then the wavelength channel's connection at this port is taken down as shown in step 711. Furthermore, the controller is then notified of the incorrect correction (step 712) so that appropriate action can be taken. Next, in sequence, the outgoing wavelength identifier 403 is checked in step 715 and, if correct, then the incoming cross-connect port identifier 404 is checked in step 720 and, if correct, then the incoming wavelength identifier 402 is checked in step 725.

If any of these steps fail then steps 711 (tear down) and 712 (notify controller) are carried out.

If the incoming wavelength identifier is correct, then other optional steps can be carried out. By way of example, a user verification data (field 407) pattern can be checked against stored information in step 730. Again, if the result is not okay (e.g., no match), then steps 711 are 712 are carried out as mentioned previously. If, however, the results of step 730 are okay (e.g., a match), then controller 102 is notified of a correct connection in step 740 and the connection verification process proceeds normally.

As described herein, aspects of the present invention can be embodied in the form of methods and apparatuses for practicing those methods. Aspects of the invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. Aspects of the present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It should also be noted that the foregoing merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, and the like represent various processes which may be substantially represented in computer readable medium and so executed by a computer or processor, whether or not such computer or processor is explicitly shown. The functions of various elements shown in the drawing may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included.

In the claims hereof, any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regard any means which can provide those functionalities as equivalent to those shown herein.

What is claimed is:

1. A method of verifying that an optical signal has been routed from an input to an output of an optical cross-connect according to a predetermined routing path established in a cross-connect map, the method comprising:

at the input, independently tagging the optical signal with identification information;

at the output, retrieving the identification information from the tagged optical signal; and determining from the retrieved identification information whether the optical signal is routed according to the predetermined routing path.

2. The method according to claim 1, wherein the step of tagging comprises directly modulating an envelope of the optical signal at a predetermined modulation index.

3. The method according to claim 1, wherein the step of tagging comprises:

modulating an envelope of the optical signal with a subcarrier signal; and modulating the subcarrier signal with the identification information.

4. The method of claim 1, wherein the identification information is contained in a connection verification message having a plurality of message fields, each of the plurality of message fields including information selected from the group consisting of a message identification, incoming wavelength information, outgoing wavelength information, incoming port information, outgoing port information, a time stamp, and user verification data.

5. A method of verifying connections in an optical cross-connect, wherein the connections are established in accordance with a cross-connect map, the method comprising:

creating a connection verification message for an optical signal based on a predetermined route defined in the cross-connect map for the optical signal;

at a cross-connect input, tagging the optical signal with the connection verification message;

at each cross-connect output, retrieving the respective connection verification message; and comparing identification information from retrieved connection verification messages with connections specified in the cross-connect map to determine whether the optical signals were routed according to prescribed routes in the cross-connect map.

6. The method according to claim 5, further comprising the step of tearing down the connection for an optical signal when that optical signal is determined as not being routed according to its prescribed route.

7. The method according to claim 5, further comprising the step of, at each cross-connect output, removing the connection verification message.

8. The method according to claim 5, wherein the step of tagging comprises directly modulating an envelope of the optical signal.

9. The method according to claim 8, wherein the envelope of the optical signal is modulated at a predetermined modulation index.

10. The method according to claim 9, wherein the predetermined modulation index is less than approximately 10%.

11. The method according to claim 5, wherein the step of tagging comprises:
   modulating an envelope of the optical signal with a subcarrier signal; and
   modulating the subcarrier signal with the connection verification message.

12. The method according to claim 11, wherein the subcarrier signal is a low frequency signal.

13. The method according to claim 5, wherein the connection verification message includes a plurality of message fields, each of the plurality of message fields including identification information selected from the group consisting of a message identification, incoming wavelength information, outgoing wavelength information, incoming port information, outgoing port information, a time stamp, and user verification data.

14. The method according to claim 13, wherein the user verification data includes a test pattern for checking transmission quality of a connection.

15. The method according to claim 5, wherein each cross-connect input is capable of receiving one optical signal and each cross-connect output is capable of supplying one optical signal.

16. The method according to claim 5, wherein each cross-connect input is capable of receiving a multi-wavelength optical signal having a plurality of optical channels of different wavelengths, wherein each cross-connect output is capable of supplying a multi-wavelength optical signal having a plurality of optical channels of different wavelengths, wherein each of the multi-wavelength optical signals can be routed as a composite signal from any of the plurality of cross-connect inputs to any of the plurality of cross-connect outputs, and wherein the step of tagging comprises tagging at least one of the plurality of optical channels in each of the multi-wavelength optical signals, such that a connection verification message in a tagged optical channel corresponds to all other optical channels in the corresponding multi-wavelength signal.

17. The method according to claim 5, wherein each cross-connect input is capable of receiving a multi-wavelength optical signal having a plurality of optical channels of different wavelengths, wherein each cross-connect output is capable of supplying a multi-wavelength optical signal having a plurality of optical channels of different wavelengths, wherein any of the plurality of optical channels can be routed from any of the plurality of cross-connect inputs to any of the plurality of cross-connect outputs, and wherein the step of tagging comprises tagging each of the plurality of optical channels.

18. An optical cross-connect having a plurality of inputs, a plurality of outputs, a switching fabric for interconnecting optical signals from any of the plurality of inputs to any of the plurality of outputs, a cross-connect map including prescribed routing information corresponding to cross-connection of the optical signals, and a cross-connect controller responsive to the prescribed routing information for causing the cross-connections to be established in the switching fabric, CHARACTERIZED IN THAT
   the cross-connect controller is operable to create a connection verification message for an optical signal based on a predetermined route defined in the cross-connect map for the optical signal;
   the cross-connect further comprising:
      at one of the plurality of inputs, a modulator for impressing the connection verification message onto the optical signal; and
      at one of the plurality of outputs, a demodulator for retrieving the connection verification message from the optical signal,
   wherein, responsive to the retrieved connection verification message, the cross-connect controller compares identification information in the retrieved connection verification message with the prescribed routing information so that routing of the optical signal along the predetermined route can be verified.

19. The optical cross-connect according to claim 18, wherein
   when routing of the optical signal is different than the predetermined route associated with that optical signal, the cross-connect controller is operable to tear down the cross-connection of that optical signal.

20. The optical cross-connect according to claim 18, wherein the modulator is capable of modulating an envelope of the optical signal at a predetermined modulation index.

21. The optical cross-connect according to claim 20, wherein the predetermined modulation index is less than approximately 10%.

22. The optical cross-connect according to claim 18, wherein the modulator is capable of modulating an envelope of the optical signal with a subcarrier signal, the subcarrier signal being modulated with the connection verification message.

23. The optical cross-connect according to claim 18, wherein the connection verification message includes a plurality of message fields, each of the plurality of message fields including identification information selected from the group consisting of a message identification, incoming wavelength information, outgoing wavelength information, incoming port information, outgoing port information, a time stamp, and user verification data.

24. A method of verifying that an optical signal has been routed from an input to an output of a network element in accordance with a predetermined routing path, the method comprising:
   at the input, independently tagging the optical signal with a routing verification message;
   at the output, retrieving the routing verification message from the tagged optical signal; and
   determining from the retrieved routing verification message whether the optical signal is routed according to the predetermined routing path.

25. The method according to claim 24, wherein the step of tagging includes directly modulating an envelope of the optical signal with the identification information.

26. The method according to claim 24, wherein the network element is selected from the group consisting of an optical cross-connect, an optical router, and an optical switch.

27. The method according to claim 24, wherein the routing verification message includes a plurality of message fields, each of the plurality of message fields including identification information selected from the group consisting of a message identification, incoming wavelength information, outgoing wavelength information, incoming port information, outgoing port information, a time stamp, and user verification data.

* * * * *